United States Patent
Loewe et al.

(10) Patent No.: US 8,602,674 B2
(45) Date of Patent: Dec. 10, 2013

(54) DEVICE FOR CONNECTING TWO COMPONENTS

(75) Inventors: Hubert Loewe, Weselberg (DE); Juergen Hofmann, Eisenberg (DE); Klaus Hock, Wiesbaden (DE); Anett Kilian, Trebur (DE)

(73) Assignees: TRW Automotive Electronics & Components GmbH, Radolfzell (DE); GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/165,891

(22) Filed: Jun. 22, 2011

(65) Prior Publication Data
US 2012/0155951 A1 Jun. 21, 2012

(30) Foreign Application Priority Data
Jul. 1, 2010 (DE) .......................... 10 2010 025 778

(51) Int. Cl.
*F16C 11/00* (2006.01)
(52) U.S. Cl.
USPC ............................ 403/135; 403/143; 403/115
(58) Field of Classification Search
USPC ................... 403/76, 114, 115, 135, 141–143
See application file for complete search history.

(56) References Cited

U.S. PATENT DOCUMENTS

| | | | | |
|---|---|---|---|---|
| 4,084,913 A | * | 4/1978 | Schenk | 403/141 |
| 4,111,570 A | * | 9/1978 | Morel | 403/18 |
| 4,200,405 A | * | 4/1980 | Bauer | 403/142 |
| 5,047,904 A | * | 9/1991 | Vraux | 362/549 |
| 5,613,792 A | * | 3/1997 | Terada et al. | 403/131 |
| 5,626,433 A | * | 5/1997 | Iwamoto | 403/76 |
| 5,908,239 A | * | 6/1999 | Sugimoto | 362/528 |
| 6,692,176 B1 | * | 2/2004 | Fladhammer | 403/2 |
| 6,748,820 B2 | * | 6/2004 | Ruhlander | 74/502.4 |
| 2007/0253765 A1 | * | 11/2007 | Knopp et al. | 403/122 |
| 2008/0175654 A1 | * | 7/2008 | Schilz et al. | 403/132 |

FOREIGN PATENT DOCUMENTS

DE    10 2007 023 478    7/2008

* cited by examiner

*Primary Examiner* — Joshua Kennedy
(74) *Attorney, Agent, or Firm* — Tarolli, Sundheim, Covell & Tummino LLP

(57) ABSTRACT

A device for connecting two components, in particular a linkage of bars (38) and an engine hood (40), includes a fastening element (10) and a securing element (24) cooperating with the fastening element (10). The fastening element (10) includes a fastening section (18) for connecting the fastening element (10) with the first component and a receiving section (12) for mounting the second component. The securing element (24) includes first and second securing sections (26, 28) and is transferable to a final assembly position, in which the first securing section (26) secures the connection of the fastening element (10) with the first component and at the same time the second securing section (28) secures the mounting of the second component in the receiving section (12).

20 Claims, 5 Drawing Sheets

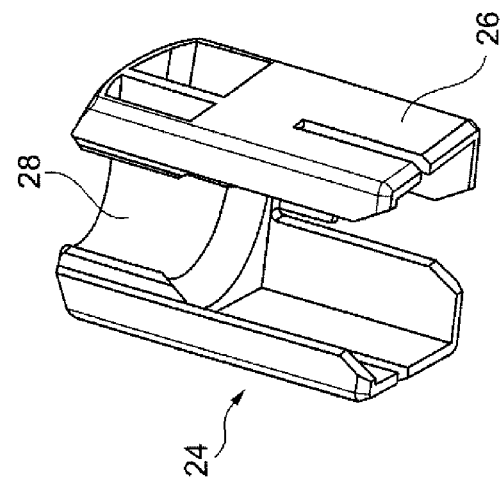
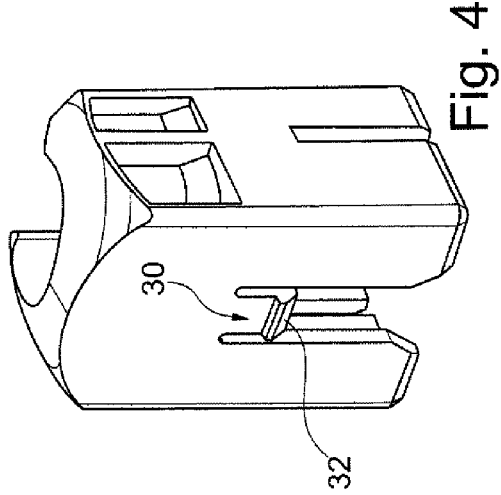
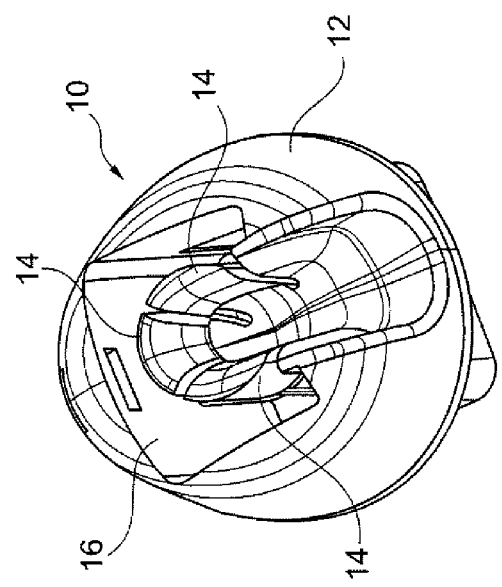
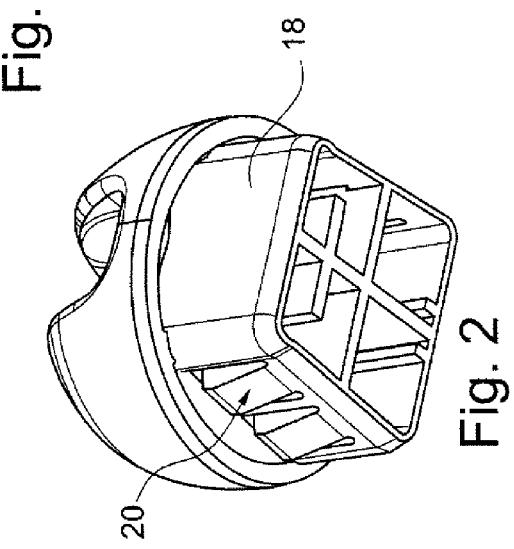

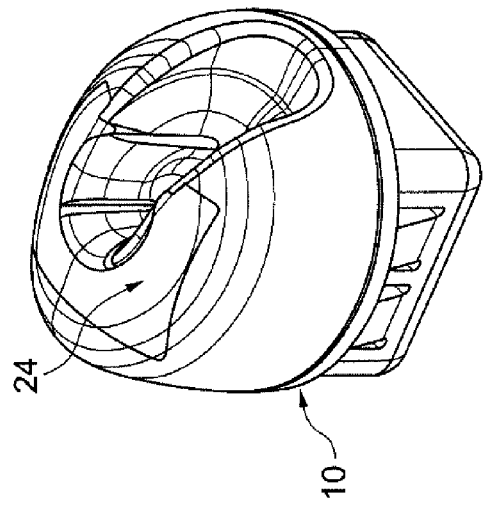
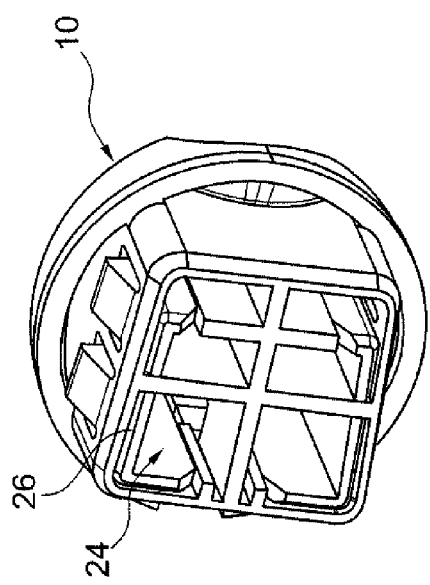
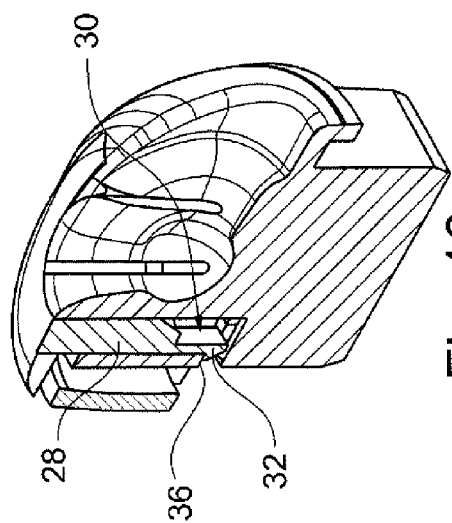
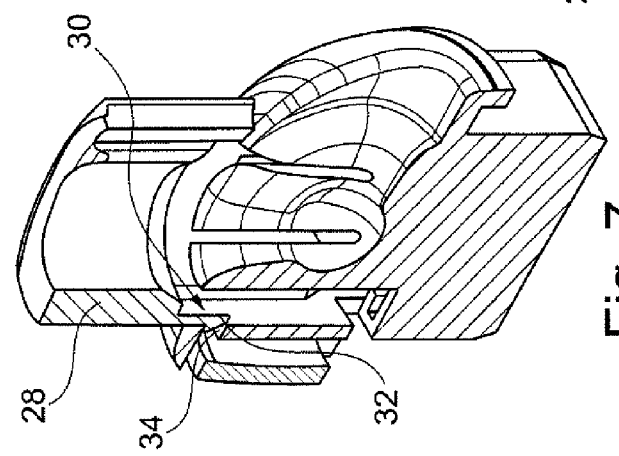

DEVICE FOR CONNECTING TWO COMPONENTS

RELATED APPLICATIONS

This application claims priority to German Patent Appln. No. 10 2010 025 0778.8, filed Jul. 1, 2010, the subject matter of which is incorporated herein in its entirety.

TECHNICAL FIELD

The present invention relates to a device for connecting two components, in particular a linkage of bars and an engine hood. The present invention further relates to a method of connecting two components, in particular a linkage of bars and an engine hood.

BACKGROUND OF THE INVENTION

DE 10 2007 023 478 A1 proposes various embodiments of a generic device for connecting a linkage of bars with an engine hood. A disadvantage of this and also of other known unsecured connecting devices is the limited holding forces. When the hood is opened and the linkage is actuated, an overpressing of the linkage in the seat of the connecting device may possibly occur. In this case, the connecting device may become detached from the hood, which, of course, is not desirable.

A further problem with the known connecting devices relates to the mounting of the linkage in the connecting device. In case of application of a sufficient amount of force, it may happen here as well that the linkage becomes detached from the seat of the connecting device in an undesirable manner.

It is the object of the invention to indicate a connecting device that is safe and simple to handle and by which the above-mentioned disadvantages are avoided.

This object is achieved by a device having the features of claim 1 and by a method having the features of claim 7. Advantageous and expedient further configurations of the device according to the invention and of the method according to the invention are indicated in the associated dependent claims.

SUMMARY OF THE INVENTION

The device according to the invention serves to connect two components, in particular a linkage of bars and an engine hood, and includes a fastening element and a securing element cooperating with the fastening element. The fastening element includes a fastening section for connecting the fastening element with the first component and a receiving section for mounting the second component. The securing element includes first and second securing sections and can be transferred to a final assembly position, in which the first securing section secures the connection of the fastening element with the first component and at the same time the second securing section secures the mounting of the second component in the receiving section.

As a result, the invention provides a dual safety concept. For one thing, securing the connection of the fastening element with the first component (more particularly an engine hood) provides for an interference fit involving very high withdrawal forces, i.e. the connecting device can not be withdrawn from the first component even under exceptional circumstances. For another thing, securing the mounting of the second component (more particularly a linkage of bars) prevents the second component from slipping out of the receiving section of the fastening element in an undesirable manner. In accordance with the invention, it is possible to realize both safety measures using a connecting device which comprises only two components.

In a particularly preferred embodiment of the invention, provision is made that the securing element is transferable from a preassembly position, in which the fastening element and the securing element are captively held together, to the final assembly position, and from the final assembly position back to the preassembly position again in a nondestructive fashion. Thus, in the delivery condition, the connecting device according to the invention is equipped with an anti-loss feature, which is logistically advantageous in terms of transport and storage. Further, after an assembly the connecting device can be disassembled again, if required, and then be re-used.

A simple and intuitive handling of the connecting device according to the invention is attained in that the securing element is adapted to be inserted into the fastening element in a linear direction of insertion.

Preferably, one of the securing element and the fastening element includes a latching section and the other of the securing element and the fastening element includes two counter-latching sections, the latching section producing a latching connection with the first counter-latching section in the preassembly position and with the second counter-latching section in the final assembly position. The two latching connections therefore uniquely define the preassembly position and the final assembly position, which makes assembly easier for the fitter. In addition, the latching connections ensure that the preassembly and final assembly positions are maintained even under external influences.

In order to allow the second component to be easily taken out of the receiving section of the fastening element and/or the connecting device to be easily removed from the first component, the fastening element includes an opening through which, in the final assembly position, the latching section or the second counter-latching section is accessible with a tool.

According to a preferred embodiment of the device according to the invention, the receiving section includes a plurality of flexurally resilient holding sections which in the final assembly position are engaged by the second securing section in such a manner that the holding sections can not be moved against a pretensioning direction.

The invention also provides a method of connecting two components, in particular a linkage of bars and an engine hood, by means of a device according to the invention. The method according to the invention includes the steps of:

fastening the fastening section of the fastening element to the first component;

mounting the second component in the receiving section of the fastening element; and transferring the securing element to the final assembly position for simultaneously securing the connection of the fastening element with the first component and the mounting of the second component in the receiving section.

To exclude any incorrect assembly to the greatest possible extent, provision is preferably made that the securing element latches in the final assembly position and preferably also in a preassembly position.

In accordance with an advantageous further development of the method according to the invention, both the connection of the fastening element with the first component and also the mounting of the second component in the receiving section of the fastening element can be unlocked by releasing the latching connection in the final assembly position using a tool. In this way, it is possible in a simple manner to shift the securing element from the final assembly position back into the pre-assembly position without any part of the connecting device being damaged. In the unlocked condition, the second component can then be removed from the seat of the fastening element and/or the connecting device can be removed from the first component, if required.

BRIEF DESCRIPTION OF THE DRAWINGS

Further features and advantages of the invention will be apparent from the following description of an exemplary embodiment and from the accompanying drawings, to which reference is made and in which:

FIG. 1 shows a perspective top view of a fastening element of the connecting device according to the invention;

FIG. 2 shows a perspective bottom view of the fastening element of FIG. 1;

FIG. 3 shows a perspective front view of a securing element of the connecting device according to the invention;

FIG. 4 shows a perspective rear view of the securing element of FIG. 3;

FIG. 7 shows a perspective sectional view of the connecting device according to the invention in the preassembly position;

FIG. 8 shows a perspective top view of the connecting device according to the invention in the final assembly position;

FIG. 9 shows a perspective rear view of the connecting device according to the invention in the final assembly position;

FIG. 10 shows a perspective sectional view of the connecting device according to the invention in the final assembly position;

DETAILED DESCRIPTION

Figure 5:
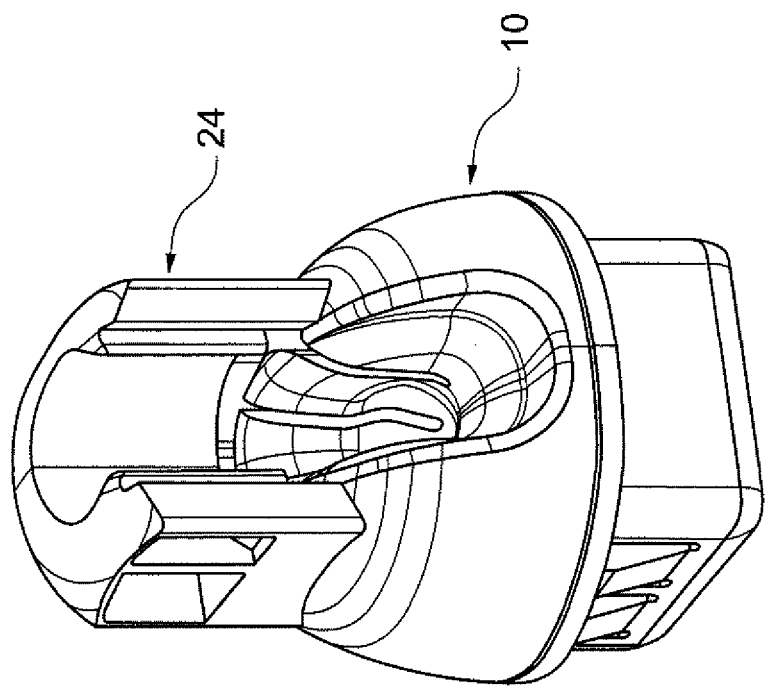
FIG. 5 shows a perspective front view of the connecting device according to the invention in the preassembly position.

FIGS. 1 and 2 illustrate a fastening element 10 which is part of a connecting device for connecting a first component (here an engine hood) with a second component (here a (gas spring) linkage of bars). The fastening element 10 includes a receiving section 12 having a pan-like seat for a ball-shaped end piece of the linkage, the seat permitting a swivel-mounting of the linkage. The seat includes a plurality of flexurally resilient holding sections 14 in the form of clip elements having undercuts. The top view also shows a channel 16 for receiving the securing element described below. FIG. 2 shows a fastening section 18 of the fastening element 10, which serves to connect the fastening element 10 with the engine hood and includes a plurality of latching members 20. The latching members 20 are in the form of flexurally resilient latching noses.

FIGS. 3 and 4 show the separate securing element 24, which likewise is part of the connecting device and cooperates with the fastening element 10, as will be discussed further below. The shape of the securing element 24 is adjusted to that of the channel 16 of the fastening element 10 in such a way that it can be inserted therein. The securing element 24 includes first and second securing sections 26 and 28 and a latching section 30 having a flexurally resilient latching hook 32.

Figure 6:
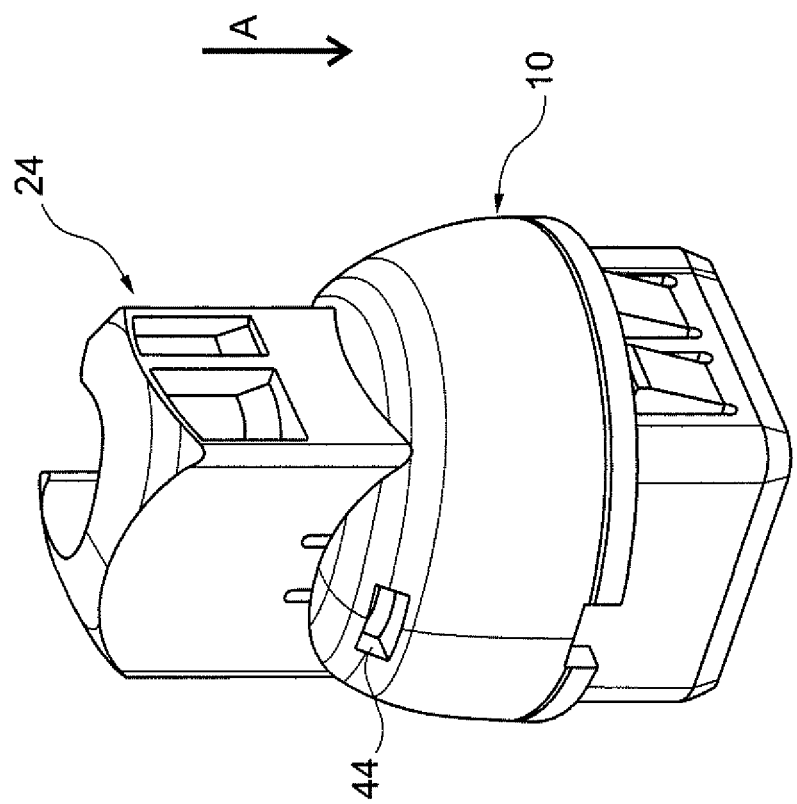
FIG. 6 shows a perspective rear view of the connecting device according to the invention in the preassembly position.

FIGS. 5 to 7 show the two-part connecting device in a stable preassembly position, which corresponds to the delivery condition of the connecting device. The securing element 24 is inserted into the fastening element 10 in a linear insertion direction A only so far that the major part of the securing element 24 still protrudes out of the fastening element 10 while the latching section 30 of the securing element 24 produces a latching connection with a first counter-latching section 34 of the fastening element 10. More precisely, the latching hook 32 snaps in behind the edge of a first recess of the wall of the channel 16. In the preassembly position, the mobility of the holding sections 14 and of the latching members 20 of the fastening element 10 is not impaired by the securing element 24. But the latching connection prevents that the securing element 24 can become detached from the fastening element 10.

FIGS. 8 to 10 show the connecting device in a stable final assembly position, which is reached in that the securing element 24 is inserted farther into the fastening element 10 in the insertion direction A, until the latching section 30 of the securing element 24 produces a latching connection with a second counter-latching section 36 of the fastening element 10. More precisely, the latching hook 32 snaps in behind the edge of a second recess of the channel wall. In the final assembly position, the securing element 24 terminates flush with the fastening element 10 on the side of the receiving section 12. In the final assembly position, the first securing section 26 of the fully inserted securing element 24 prevents the flexurally resilient latching elements 20 from being able to be swiveled inwards. The second securing section 28 prevents the flexurally resilient holding sections 14 (clip elements) from being able to be swiveled outwards.

Figure 11:
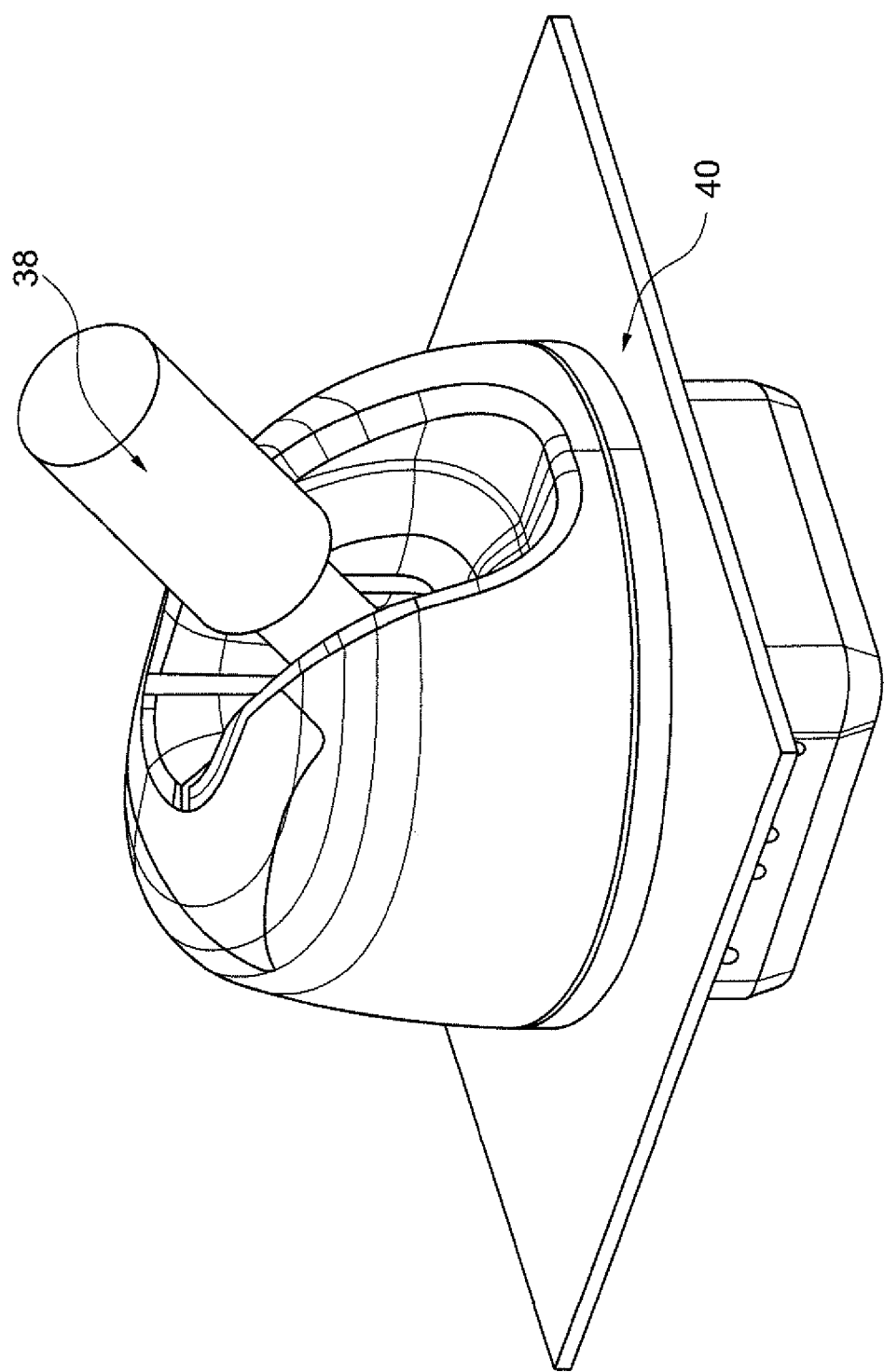
FIG. 11 shows a perspective front view of the connecting device according to the invention in the installed condition.

The significance of the securing element 24 in the final assembly position is apparent from the assembly description, in which reference is made to FIG. 11, among others, which shows the connecting device in the installed condition.

The connecting device is in the preassembly position, i.e. with the securing element 24 partly inserted in the fastening element 10, before the ball-shaped end (not visible in FIG. 11) of a linkage 38 is pushed into the seat of the fastening element 10. The holding sections 14 first yield in the process, but then, owing to their flexural resilience, snap back towards the center of the seat and exert a pretensioning force on the ball-shaped end of the linkage 38. The end of the linkage 38 is thus securely held in the seat while, however, the linkage can exercise defined swiveling movements.

In this condition of the connecting device, the fastening section 18 of the fastening element 10 is inserted into an opening or recess, adjusted to the diameter thereof, of an engine hood 40, until the latching members 20 engage behind the edge of the opening to hold the connecting device against the engine hood 40. Subsequently, the connecting device is transferred to the final assembly position by fully inserting the securing element 24.

In the final assembly position, the connecting device can not unintentionally be removed from the engine hood 40 because the securing element 24 secures the connection of the fastening element 10 with the engine hood 40 by the first securing section 26 making it impossible for the latched latching elements 20 to move inwards. At the same time, the second securing section 28 holds the holding sections 14 in position, so that the holding sections 14 can not be swiveled outwards, as a result of which the ball-shaped end of the linkage 38 is also secured in the seat. The installed condition thus reached is shown in FIG. 11.

Figure 13:
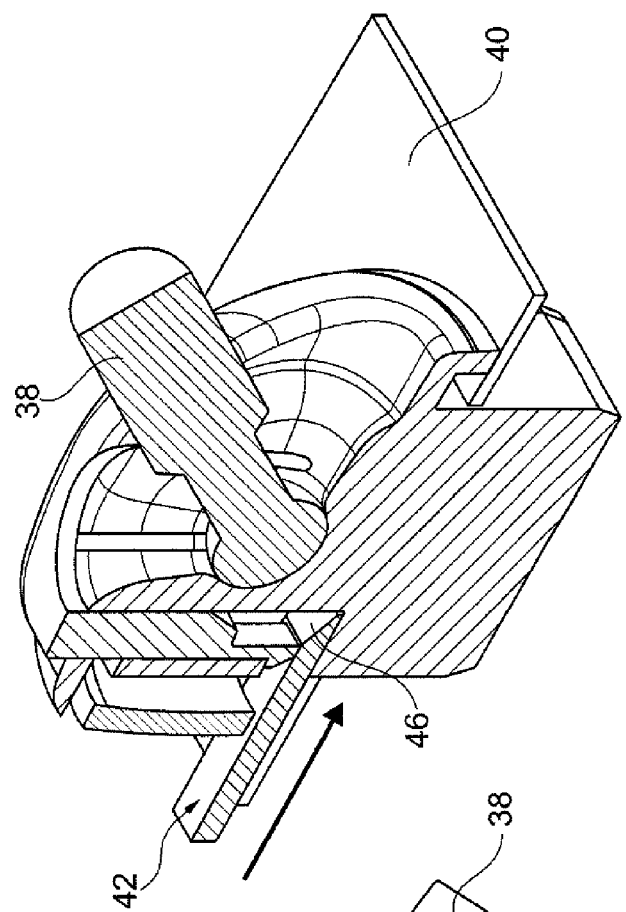
FIG. 13 shows a perspective sectional view of the connecting device according to the invention in the installed condition during releasing of the final assembly position.
Figure 12:
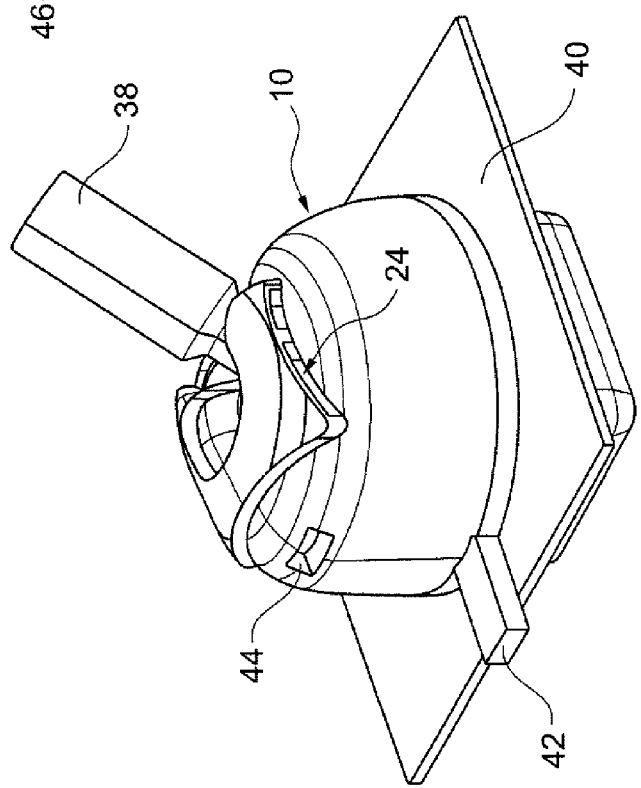
FIG. 12 shows a perspective rear view of the connecting device according to the invention in the installed condition during releasing of the final assembly position.

As can be seen from FIGS. 12 and 13, the connecting device can be unlocked and disassembled with the aid of a tool 42, without any damage being done to the connecting device. To this end, a screwdriver or the like is inserted into an opening 44 of the fastening element 10, through which the latching section 30 and the second counter-latching section 36 are accessible. Using the tool 42, the latching connection between the fastening element 10 and the securing element 24 is released by swiveling the latching hook 32 of the securing element 24 inwards. The tool 42 has a ramp 46 so that, after releasing the latching connection, the securing element 24 is lifted. The securing element 24 can now be grasped at the undercuts of the holding sections 14 and be pulled out until the preassembly position is reached, in which the latching section 30 produces a latching connection with the first counter-latching section 34.

In this condition, the holding sections 14 are no longer secured by the second securing section 28 of the securing element 24, so that the linkage 38 can be pulled out of the seat of the fastening element 10. The latching elements 20 of the fastening section 18 of the fastening element 10 are no longer secured by the first securing section 26 of the securing element 24, either, so that, if required, the entire connecting device can be withdrawn from the opening or recess of the engine hood 40 by pushing the latching members 20 in.

LIST OF REFERENCE NUMBERS 10 fastening element
12 receiving section
14 holding sections
16 channel
18 fastening section
20 latching members
24 securing element
26 first securing section
28 second securing section
30 latching section
32 latching hook
34 first counter-latching section
36 second counter-latching section
38 linkage of bars
40 engine hood
42 tool
44 opening
46 ramp

The invention claimed is:

1. A device for connecting two components, in particular a linkage of bars (38) and an engine hood (40), comprising
   a fastening element (10) and a securing element (24) insertable into the fastening element (10) in a linear insertion direction (A), the fastening element (10) including a fastening section (18) having a plurality of latching members (20) for connecting the fastening element (10) with the first component and a receiving section (12) for mounting the second component,
   wherein the securing element (24) includes first and second securing sections (26, 28) and is transferable along the insertion direction (A) from a preassembly position, in which the fastening element (10) and the securing element (24) are captively held together while the first securing section (26) is spaced from the latching members (20) along the insertion direction (A) to allow for inward movement of the latching members (20) into an interior space of the fastening element (10), to a final assembly position, in which the first securing section (26) extends into the interior space and prevents inward movement of the latching members (20) to hold the receiving section (12) in a position such that the receiving section cannot be moved against a pretensioning direction to secure the connection of the fastening element (10) with the first component and at the same time the second securing section (28) is configured to secure the mounting of the second component in the receiving section (12).

2. The device according to claim 1, wherein the securing element (24) is transferable from the preassembly position to the final assembly position, and from the final assembly position back to the preassembly position again in a nondestructive fashion.

3. The device according to claim 2, wherein one of the securing element (24) and the fastening element (10) includes a latching section (30) and the other of the securing element (24) and the fastening element (10) includes two counter-latching sections (34, 36), the latching section (30) producing a latching connection with the first counter-latching section (34) in the preassembly position and with the second counter-latching section (36) in the final assembly position.

4. The device according to claim 1, wherein the fastening element (10) includes an opening (44) leading to a channel through which, in the final assembly position, one of the latching section (30) and the second counter-latching section (36) is accessible with a tool (42), the channel extending perpendicular to the insertion direction (A).

5. The device according to claim 1, wherein the receiving section (12) includes a plurality of flexurally resilient holding sections (14) which are engaged in the final assembly position by the second securing section (28) in such a manner that the holding sections (14) cannot be moved against a pretensioning direction.

6. The device according to claim 1, wherein the receiving section (12) includes a plurality of resilient holding sections (14) for mounting the second component in the receiving section (12).

7. The device according to claim 6, wherein the second securing section (28) prevents outward movement of the holding sections (14) when the first securing section (26) is in the final assembly position.

8. The device according to claim 6, wherein the first securing section (26) is positioned radially inward of the latching members (20) relative to a longitudinal centerline of the fastening element (10) and the second securing section (28) is positioned radially outward of the holding sections (14) relative to the longitudinal centerline when the first securing section (26) is in the final assembly position.

9. A method of connecting two components, in particular a linkage of bars (38) and an engine hood (40), by means of a device according to claim 1, comprising the steps of:
   fastening the fastening section (18) of the fastening element (10) to the first component;
   mounting the second component in the receiving section (12) of the fastening element (10); and
   transferring the securing element (24) to the final assembly position for simultaneously securing the connection of the fastening element (10) with the first component and the mounting of the second component in the receiving section (12).

10. The method according to claim 9, wherein the securing element (24) latches in the final assembly position and preferably also in the preassembly position.

11. The method according to claim 10, wherein both the connection of the fastening element (10) with the first component and the mounting of the second component in the receiving section (12) are unlocked by releasing the latching connection by a tool (42) in the final assembly position.

12. The method according to claim 9 further comprising providing the receiving section (12) with a plurality of resilient holding sections (14) for mounting the second component in the receiving section (12).

13. The method according to claim 12, wherein transferring the securing element (24) to the final assembly position causes the first securing section (26) to prevent inward movement of latching members (20) and causes the second securing section (28) to prevent outward movement of the holding sections (14).

14. The method according to claim 12, wherein transferring the securing element (24) to the final assembly position comprises placing the first securing section (26) radially inward of the latching members (20) relative to a longitudinal centerline of the fastening element (10) and placing the second securing section (28) radially outward of the holding sections (14) relative to the longitudinal centerline.

15. A connecting assembly comprising:
a first component, in particular a linkage of bars (38),
a second component, in particular an engine hood (40), and
a device for connecting the first and second components including
a fastening element (10) having a fastening section (18) and a receiving section (12), and
a securing element (24) insertable into the fastening element (10) in a linear insertion direction (A) and including first and second securing sections (26, 28), the fastening element (10) being mounted to the first component by a plurality of latching members (20) of the fastening section (18), the fastening element (10) being mounted to the second component by the receiving section (12),
wherein the securing element (24) is transferable along the insertion direction (A) from a preassembly position, in which the fastening element (10) and the securing element (24) are captively held together while the first securing section (26) is spaced from the latching members (20) along the insertion direction (A) to allow for inward movement of the latching members (20) into an interior space of the fastening element (10), to a final assembly position in which the first securing section (26) extends into the interior space and prevents inward movement of the latching members (20) to secure the mounting of the fastening element (10) with the first component and at the same time the second securing section (28) holds the receiving section (12) in a position such that the receiving section cannot be moved against a pretensioning direction to secure the mounting of the second component in the receiving section (12).

16. A device for connecting two components, in particular a linkage of bars (38) and an engine hood (40), comprising:
a fastening element (10) and a securing element (24) insertable into the fastening element (10) in a linear insertion direction (A),
the fastening element (10) including a fastening section (18) having a plurality of latching members (20) for connecting the fastening element (10) with the first component and a receiving section (12) for mounting the second component,
the securing element (24) including first and second securing sections (26, 28),
the securing element (24) being transferable along the insertion direction (A) from a preassembly position to a final assembly position, and from the final assembly position back to the preassembly position again, in a nondestructive fashion,
the fastening element (10) and the securing element (24) being captively held together in the preassembly position while the first securing section (26) is spaced from the latching members (20) along the insertion direction (A) to allow for inward movement of the latching members (20) into an interior space of the fastening element (10),
the first securing section (26) being moveable along the insertion direction (A) into the interior space to prevent inward movement of the latching members (20) to secure the connection of the fastening element (10) with the first component in the final assembly position, and
the second securing section (28) being configured to hold the receiving section (12) in a position such that the receiving section cannot be moved against a pretensioning direction to secure the mounting of the second component in the receiving section (12) in the final assembly position at the same time.

17. The device according to claim 16, wherein the receiving section (12) includes a plurality of flexurally resilient holding sections (14) which are engaged in the final assembly position by the second securing section (28) in such a manner that the holding sections (14) cannot be moved against a pretensioning direction, one of the securing element (24) and the fastening element (10) includes a latching section (30) and the other of the securing element (24) and the fastening element (10) includes two counter-latching sections (34, 36), the latching section (30) producing a latching connection with the first counter-latching section (34) in the preassembly position and with the second counter-latching section (36) in the final assembly position, and the securing element (24) neither impairs mobility of the holding sections (14) nor of the latching members (20) of the fastening element (10) in the preassembly position.

18. A method of connecting two components, in particular a linkage of bars (38) and an engine hood (40), comprising the steps of:
providing a device according to claim 17 with the securing element (24) being in the preassembly position, so that the fastening element (10) and the securing element (24) are captively held together;
fastening the fastening section (18) of the fastening element (10) to the first component while the securing element (24) is in the preassembly position;
mounting the second component in the receiving section (12) of the fastening element (10) while the securing element (24) is in the preassembly position; and
transferring the securing element (24) to the final assembly position for simultaneously securing the connection of the fastening element (10) with the first component and the mounting of the second component in the receiving section (12).

19. The method according to claim 18, wherein the securing element (24) latches in the final assembly position and also in the preassembly position.

20. The method according to claim 18, wherein both the connection of the fastening element (10) with the first component and the mounting of the second component in the receiving section (12) are unlocked by releasing the latching connection in the final assembly position with a tool (42)

being inserted into an opening (44) leading to a channel of the fastening element (10) extending perpendicular to the insertion direction (A).

\* \* \* \* \*